United States Patent Office 3,781,323
Patented Dec. 25, 1973

3,781,323
CYANO- AND TRIFLUOROMETHYL-SUBSTITUTED 6-NITROANILINES
Klaus Wagner and Ludwig Eue, Cologne, and Erich Klauke, Odenthal, Germany, assignors to Bayer Aktiengesellschaft, Leverkusen, Germany
No Drawing. Filed Feb. 9, 1971, Ser. No. 114,071
Claims priority, application Germany, Feb. 28, 1970, P 20 09 497.7
Int. Cl. C07c *121/78*
U.S. Cl. 260—465 E                    20 Claims

ABSTRACT OF THE DISCLOSURE

Novel 6-nitroaniline compounds of the formula

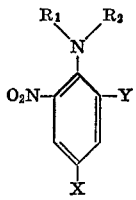

in which $R_1$ is hydrogen, substituted or unsubstituted alkyl or aryl, or cycloalkyl;
$R_2$ is hydrogen, alkyl or alkenyl; and
$R_1$ and $R_2$ together can form a heterocycle; and of X and Y one is cyano and the other trifluoromethyl are herbicides having outstanding activity and selectivity.

---

The present invention relates to certain new substituted 6-nitroaniline compounds, to compositions containing them and to their use as herbicides.

It is known that mono-cyanodinitroanilines, for example, 2,4 - dinitro - 6 - cyano-N,N-di-n-propylaniline, can be used as herbicides from French patent specification No. 1,369,628.

It is very surprising that the new substituted 6-nitroaniline compounds of this invention have stronger herbicidal properties than the previously known mono-cyanodinitroaniline derivatives and are also of good selective effectiveness.

The compounds of the invention are substituted 6-nitroaniline derivatives of the general formula

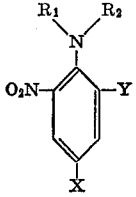

in which $R_1$ is hydrogen, alkyl, hydroxyalkyl, alkoxyalkyl, alkenyl, cycloalkyl, e.g. with from 4 to 6 ring carbons; aralkyl or unsubstituted or substituted aryl, e.g. phenyl or naphthyl;
$R_2$ is hydrogen, alkyl or alkenyl or $R_1$ and $R_2$, together with the nitrogen atom to which they are attached, form a heterocyclic radical with from, e.g., 4 to 5 ring carbons;
X and Y are selected from the group consisting of trifluoromethyl and cyano with the proviso that one of X and Y is trifluoromethyl and the other cyano.

Preferably, when $R_1$ and $R_2$ are or contain alkyl or alkenyl radicals, such radicals are lower alkyl or alkenyl of, e.g., up to 8 carbon atoms. Generally, the total number of carbon atoms in $R_1$ and $R_2$ will not exceed about 10.

Such compounds have been found to exhibit strong herbicidal properties.

The invention also provides a process for the production of a substituted 6-nitroaniline derivative of the Formula I in which a 1-alkoxy-6-nitrobenzene derivative of the general formula

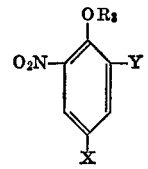

in which

X and Y are defined as above, and
$R_3$ is alkyl, is either
(a) reacted with a compound of the formula

in which $R_1$ and $R_2$ are defined as above, optionally in the presence of a solvent, or
(b) converted by reaction with pyridine and phosphorus oxychloride, optionally in the presence of a solvent, into the appropriate 1-chloro-6-nitrobenzene derivative and this is reacted with a compound of the above formula (III), optionally in the presence of an acid-binding agent.

If 1-methoxy-2-cyano-4-trifluoromethyl-6-nitrobenzene and n-butylamine are used as starting materials, the reaction course according to process variant (a) can be represented by the following formula scheme:

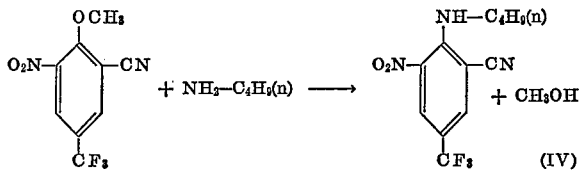

If 1-methoxy-2-trifluoromethyl-4-cyano-6-nitrobenzene and di-n-propylamine are used according to process variant (b) as starting materials, the reaction course can be represented by the following formula scheme:

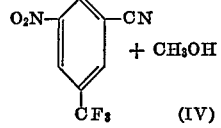

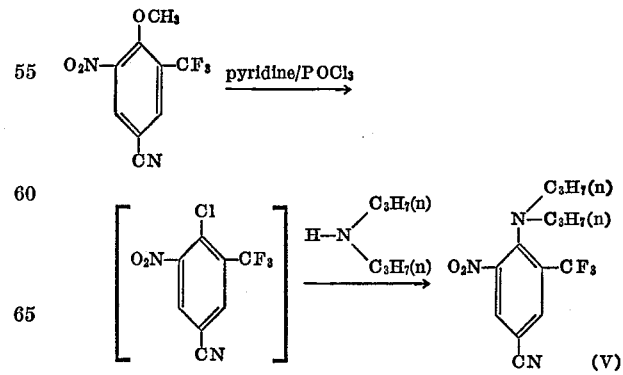

The 1-alkoxy-6-nitrobenzene derivatives used as starting materials are unambiguously characterized by the Formula II.

$R_3$ is preferably alkyl with 1 to 4 carbon atoms.

As examples of compounds of Formula II, there are mentioned: 1-methoxy-2-cyano-4-trifluoromethyl-6-nitrobenzene and 1-ethoxy - 2 - trifluoromethyl-4-cyano-6-nitrobenzene.

The 1-alkoxy-6-nitrobenzene derivatives of the Formula II are not yet known, but can be readily prepared by first reacting 1 - chloro-2-cyano-4-trifluoromethylbenzene (cf. Helv. Chim. Acta 45, 2226–2241 (1962)) or 1-chloro-2-trifluoromethyl-4-cyano-benzene (cf. Compt. Rend. 257 (21), 3182–3184 (1963)) with alkoxides in the presence of polar solvents, preferably alcohols such as methanol or ethanol, at temperatures of about 50–100° C., to give the appropriate 1-alkoxybenzenes, and subsequently nitrating these with nitric acid at a temperature of 0 to 10° C.

The following examples are intended to illustrate this preliminary process:

Example A.—Preparation of 2-cyano-4-trifluoromethyl-anisole

(A)

To a sodium methylate solution prepared from 23 g. (1 gram-atom) of sodium and 1000 ml. of methanol there were added, in portions, 205 g. (1 mole) 1-chloro-2-cyano-4-trifluoromethylbenzene at 60–65° C., and boiled under reflux was effected for 8 hours. After cooling, the separated sodium chloride was filtered off with suction and the excess methanol was distilled off in a vacuum. The oil remaining behind was taken up in methylene chloride, and the solution was washed with water and dried over sodium sulfate. After the methylene chloride had been distilled off in vacuum, 116 g. (82% of the theory) of 2-cyano-4-trifluoromethylanisole of the boiling point 90° C. at 0.12 mm. Hg were obtained. After standing for a longer period, the product crystallized in the form of pale-yellow needles of melting point 33–34° C.

Example B.—Preparation of 2-cyano-4-trifluoromethyl-6-nitroanisole

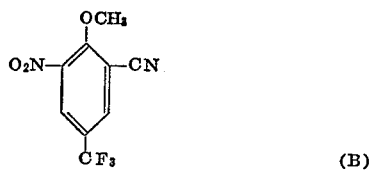

(B)

300 ml. of nitric acid (d.=1.52) were cooled to 5° C., and 60 g. 2-cyano-4-trifluoromethylanisole were added, in portions, with vigorous stirring; the temperature did not exceed 10° C. The reaction mixture was kept at 0–5° C. for a further 2 hours, pouring on to ice was effected, the nitration product was taken up in methylene chloride, the organic phase was washed neutral with water, and the methylene chloride solution was dried over sodium sulfate. After the solvent had been drawn off in a vacuum, 52 g. (71% of the theory) of 2-cyano-4-trifluoromethyl-6-nitro-anisole were obtained in the form of a reddish-yellow oil which solidified into yellow crystals in an ice box.

In corresponding manner, starting from 1-chloro-2-trifluoromethyl-4-cyanobenzene, there is prepared 2-trifluoromethyl-4-cyano-6-nitroanisole.

The compounds of the Formula III used as starting materials are known.

Most preferably, $R_1$ is hydrogen, alkyl with 1 to 4 atoms, cycloalkyl with 5 to 6 carbon atoms, aralalkoxyalkyl with 1 to 4 carbon atoms in each of the alkyl and alkoxy moieties, alkenyl with 2 to 4 carbon atoms, cycloalkyl with 5 to 6 carbon atoms, aralkyl with 1 to 2 carbon atoms in the alkyl moiety, or phenyl (which phenyl may be substituted by chlorine, bromine, trifluoromethyl and/or methyl), and $R_2$ is hydrogen, alkyl with 1 to 4 carbon atoms, or alkenyl with 2 to 4 carbon atoms; or $R_1$ and $R_2$, together with the nitrogen atom and optionally also oxygen or sulfur atoms, form a 5- to 6-membered ring.

As examples of compounds of Formula (III), there can be mentioned: ammonia, methylamine, ethylamine, n-propylamine, 2-hydroxyethylamine, 2-methoxyethylamine, iso-butylamine, tert.-butylamine, allylamine, cyclohexylamine, benzylamine, dimethylamine, diethylamine, di-n-propylamine, di-n-butylamine, diallylamine, aniline, pyrrolidine, piperidine and morpholine.

Preferred solvents for the reaction of process variant (a), include alcohols, such as methanol or ethanol, and ketones, such as acetone or methylethyl ketone. For the reaction of process variant (b), inert organic solvents are mainly suitable; these include hydrocarbons, such as benzene or toluene; ethers, such as diethyl ether, tetrahydrofuran or dioxan; esters, such as ethyl acetate; and nitriles, such as acetonitrile.

As acid-binders, all customary acid-binding agents can be used. Preferred examples include alkali metal hydroxides, alkali metal carbonates and tertiary amines. Especially suitable are triethylamine and pyridine, and preferably an excess of the compound of Formula III.

The reaction temperatures can be varied within a fairly wide range. In general, reaction (a) is carried out at 20 to 100° C., preferably 40 to 80° C.; reaction (b) at 40 to 160° C., preferably 60 to 140° C.

When carrying out process variant (a), it is preferred to use approximately stoichiometric proportions. In process variant (b), the components are, in general, likewise used in equimolar amounts. If excess of the amine of Formula III is used as acid-binding agent, preferably 2.2–2.5 moles of this amine are used for each mole of the compound of Formua II.

The working up of the reaction mixtures may be effected in customary manner.

The active compounds of this invention exhibit a strong herbicidal, particularly selective, potency. They can therefore be used for the control of weeds. As weeds in the widest sense are meant all plants which grow in places where they are not desired. Whether the substances according to the invention act as total or as selective herbicides depends essentially on the amount applied.

The substances according to the invention can be used for example in the case of the following plants: dioctyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettles (Urtica, grounsel (Scenecio), cotton (Glossypium), beets (Beta), carrots (Daucus), beans (Phaseolus), potatoes (Solanum), coffee (Coffea); monocotyledone, such as timothy (Phleum), bluegrass (Poa), fescue (Festuca, Goosegrass (Eleusine), foxtail (Setaria), ryegrass (Lolium), cheat (Bromus), barnyard grass (Eichinochloa), corn (Zea), rice (Oryza), oats (Avena), barley (Hordeum), wheat (Triticum), millet (Panicum), sugar cane (Saccharum).

Particularly advantageous is the use for weed control in cereals, maize and cotton.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents of carriers, optionally with the use of surface-active agents, that is, emulsifying agents and/or dispersing agents. In the case of the use of water as an extender organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulfite waste liquors and methyl cellulose.

The active compounds according to the invention may be present in the formulations in admixture with other active compounds or may be mixed at the time of application.

The formulations contain, in general, 0.1 to 95, preferably 0.5 to 90 percent by weight of active compound.

The active compounds may be applied as such or in the form of their formulations or of the applications forms prepared therefrom, such as ready-to-use solutions, emulsions, suspensions, powders, pastes and granulates. Application may take place in the usual manner for example by spraying, squirting, dusting or scattering.

When the compounds are applied as total herbicides, the amounts of active compounds are usually 40–80 kg./hectare. In the case of use for selective weed control, the amounts applied are usually 1–20 kg./hectare, preferably 2–10 kg./hectare.

The active compounds can be used both before and after the emergence of the cultivated plants and weeds, chiefly before the emergence.

The active compounds according to the invention also exhibit insecticidal and fungicidal properties.

The invention therefore procides a herbicidal composition containing as active ingredient a compound according to the invention in admixture with a solid diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a solid or liquid diluent or carrier.

The invention is illustrated by the following examples, in which the following were used as test compounds illustrative of the present invention:

TABLE

| Compound number | Chemical name | Structure |
|---|---|---|
| 1 | 2-cyano-4-trifluoro-methyl-6-nitro-N-n-butylaniline | $F_3C$—⟨ring⟩—$NH$—$C_4H_9$-n, with CN and $NO_2$ substituents |
| 2 | 2-cyano-4-trifluoro-methyl-6-nitro-N,N-di-n-propylaniline | $F_3C$—⟨ring⟩—$N(C_3H_7$-n$)_2$, with CN and $NO_2$ substituents |
| 3 | 2-cyano-4-trifluoro-methyl-6-nitro-N-n-propylaniline | $F_3C$—⟨ring⟩—$NH$—$C_3H_7$-n, with CN and $NO_2$ substituents |

Example A.—Pre-emergence test

Solvent: 5 parts by weight acetone
Emulsifier: 1 part by weight alkylaryl polyglycol ether To produce a suitable preparation of active compound, 1 part by weight of active compound is mixed with the stated amount of solvent, the stated amount of emulsifier is added and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0 = no effect
1 = slight damage or delay in growth
2 = marked damage or inhibition of growth
3 = heavy damage and only dificient development or only 50% emerged
4 = plants partially destroyed after germination or only 25% emerged
5 = plants completely dead or not emerged.

The active compounds, the amounts applied and the results obtained can be seen from Table A.

TABLE A.—PRE-EMERGENCE TEST

| Active compound | Active compound applied, kg./hectare | Echino-chloa | Cheno-podium | Stel-laria | Lolium | Oats | Barley | Rye | Rice | Wheat |
|---|---|---|---|---|---|---|---|---|---|---|
| $O_2N$—⟨ring with $NO_2$, CN⟩—$N(C_3H_7$-n$)_2$ (known) | 10 | 2 | 0 | 0 | 0 | 0 | 0 | 0 | 0 | 0 |
| | 5 | 0 | 0 | 0 | 0 | 0 | 0 | 0 | 0 | 0 |
| Compound 1 | 10 | 4–5 | 4 | 4 | 5 | 2 | 0 | 0 | 1 | 0 |
| | 5 | 4 | 3 | 3 | 4–5 | 1 | 0 | 0 | 0 | 0 |
| Compound 2 | 10 | 5 | 5 | 5 | 5 | 5 | 5 | 5 | 5 | 5 |
| | 5 | 5 | 4 | 5 | 5 | 5 | 4 | 4–5 | 4–5 | 5 |
| Compound 3 | 10 | 5 | 5 | 5 | 5 | 1 | 1 | 0 | 2 | 0 |
| | 5 | 4–5 | 4 | 4 | 4–5 | 0 | 0 | 0 | 1 | 0 |

Example 1.—Preparation of 2-cyano-4-trifluoromethyl-6-nitroaniline

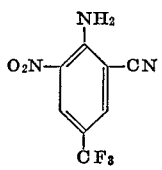

A rapid, continuous stream of NH₃ was introduced for 10 minutes into a solution (which has a temperature of 60° C.) of 12.3 g. (0.05 mole) 2-cyano-4-trifluoromethyl-6-nitroanisole (Formula B) in 100 ml. methanol, and the reaction mixture was subsequently stirred at 60° C. for 1 hour. Water was then added to the reaction mixture until it became turbid. During cooling, 11 g. (95% of the theory) of 2-cyano-4-trifluoromethyl-6-nitroaniline crystallized in orange-yellow needles of the melting point 118–119° C.

Example 2.—Preparation of 2-cyano-4-trifluoromethyl-6-nitro-N-methylaniline

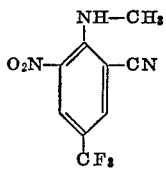

12.3 g. (0.05 mole) 2-cyano-4-trifluoromethyl-6-nitroanisole (Formula B) were dissolved in 100 ml. methanol. To this solution there was added slowly, at 50–60° C., with stirring, 7 ml. of a 40%-strength aqueous methylamine solution, and the reaction mixture was afterwards stirred for a further 30 minutes at 60° C. During cooling, 9 g. (73% of the theory) of 2-cyano-4-trifluoromethyl-6-nitro-N-methylaniline crystallized in orange-yellow needles of the melting point 101–102° C.

EXAMPLES 3–9

In corresponding manner, the compounds set forth in Table B, below, were prepared in Table B and with reference to Formula I, above, X is CF₃, Y is CN and R₁ and R₂ are as set forth in the table.

TABLE B

| | R₁ | R₂ | Melting point (° C.) |
|---|---|---|---|
| Example number: | | | |
| 3 | H | C₂H₂ | 84–85 |
| 4 | H | CH₂—CH₂—OH | 93 |
| 5 | H | CH₂—CH₂—OCH₃ | 76–77 |
| 6 | H | CH₂—CH₂—CH₃ | 60–61 |
| 7 | H | CH(CH₃)₂ | 100–101 |
| 8 | H | CH₂—CH₂—CH₂—CH₃ | 66–67 |
| 9 | H | CH₂—CH(CH₃)₂ | 88–89 |

Example 10.—Preparation of 2-cyano-4-trifluoromethyl-6-nitro-N,N-di-n-propylaniline

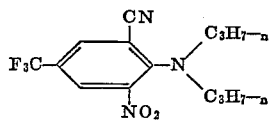

24.6 (0.1 mole) 2-cyano-4-trifluoromethyl-6-nitroanisole (Formula B) in 250 ml. xylene with 8 g. (0.1 mole) pyridine were heated to 120–130° C. for 10 minutes. The reaction mixture was cooled to 90° C. and 5.5 ml. (0.06 mole) phosphorus oxychloride were added dropwise, and stirring was afterwards effected for 1 hour at 110° C. After cooling of the reaction mixture to 80° C., 23.8 g. (0.23 mole) of di-n-propylamine were added dropwise, with stirring, and the reaction mixture was stirred for a further 30 minutes at 90° C. After cooling, the separated di-n-propylamine hydrochloride was filtered off with suction, the organic phase was washed several times with water, drying over sodium sulfate was effected, and the xylene was distilled off in a vacuum. The oily residue crystallized through completely in an ice box. After suction filtration and washing with a little cold petroleum ether, 10 g. (32% of the theory) of 2-cyano-4-trifluoromethyl-6-nitro-N,N-di-n-propylaniline were obtained in orange-yellow needles of the melting point 49–50° C.

It will be understood that the foregoing specification and examples are illustrative and not limitative of the present invention in that many other embodiments of the invention will suggest themselves to those skilled in the art.

What is claimed is:

1. 6-nitroaniline compound of the general formula

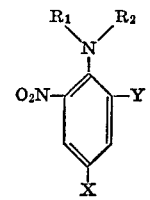

in which

R₁ is hydrogen, alkyl of from 1 to 4 carbon atoms, hydroxyalkyl of from 1 to 4 carbon atoms, or alkoxyalkyl of from 1 to 4 carbon atoms in each of the alkyl or alkoxy moieties, alkenyl of from 2 to 4 carbon atoms, cycloalkyl of from 5 to 6 carbon atoms, aralkyl of from 1 to 2 carbon atoms or unsubstituted or substituted phenyl;

R₂ is hydrogen or alkyl or alkenyl of up to 4 carbon atoms; and

X and Y are selected from the group consisting of trifluoromethyl and cyano with the proviso that one of X and Y is trifluoromethyl and the other cyano.

2. Compound as claimed in claim 1 wherein R₁ is hydrogen, alkyl of from 1 to 4 carbon atoms, hydroxyalkyl of from 1 to 4 carbon atoms, alkoxy alkyl of from 1 to 4 carbon atoms in each of the alkyl or alkoxy moiety.

3. Compound as claimed in claim 1 wherein R₁ is alkenyl of from 2 to 4 carbon atoms.

4. Compound as claimed in claim 1 wherein R₁ is cycloalkyl of from 5 to 6 carbon atoms.

5. Compound as claimed in claim 1 wherein R₁ is aralkyl of from 1 to 2 carbon atoms in the alkyl moiety and from 6 to 12 carbon atoms in the aryl moiety.

6. Compound as claimed in claim 1 wherein R₁ is unsubstituted or substituted phenyl.

7. Compound as claimed in claim 1 wherein R₂ is hydrogen or alkyl of from 1 to 4 carbon atoms.

8. Compound as claimed in claim 1 wherein R₂ is alkyl of from 2 to 4 carbon atoms.

9. Compound as claimed in claim 1 wherein X is cyano and Y is trifluoromethyl.

10. Compound as claimed in claim 1 wherein X is trifluoromethyl and Y is cyano.

11. Compound as claimed in claim 1 designated 2-cyano-4-trifluoromethyl-6-nitro-N-n-butylaniline.

12. Compound as claimed in claim 1 designated 2-cyano-4-trifluoromethyl-6-nitro-N,N-di-n-propylaniline.

13. Compound as claimed in claim 1 designated 2-cyano-4-trifluoromethyl-6-nitro-N-n-propylaniline.

14. Compound as claimed in claim 1 designated 2-cyano-4-trifluoromethyl-6-nitroaniline.

15. Compound as claimed in claim 1 designated 2-cyano-4-trifluoromethyl-6-nitro-N-methylaniline.

16. Compound as claimed in claim 1 designated 2-cyano-4-trifluoromethyl-6-nitro-N-ethylaniline.

17. Compound as claimed in claim 1 designated 2-cyano-4-trifluoromethyl-6-nitro-N-2-hydroxyethylaniline.

18. Compound as claimed in claim 1 designated 2-cyano-4-trifluoromethyl-6-nitro-N-2-methoxyethylaniline.

19. Compound as claimed in claim 1 designated 2-cyano-4-trifluoromethyl-6-nitro-N-isopropylaniline.

20. Compound as claimed in claim 1 designated 2-cyano-4-trifluoromethyl-6-nitro-N-isobutylaniline.

References Cited

UNITED STATES PATENTS

| | | | |
|---|---|---|---|
| 3,681,425 | 8/1972 | Kiehs et al. | 260—465 |
| 3,287,100 | 11/1966 | Rohr et al. | 260—465 X |

ELBERT L. ROBERTS, Primary Examiner

D. H. TORRENCE, Assistant Examiner

U.S. Cl. X.R.

71—88, 94, 95, 105; 260—247, 293.75, 326.62, 465 F

UNITED STATES PATENT OFFICE
CERTIFICATE OF CORRECTION

PO-1050
(5/69)

Patent No. 3,781,323  Dated December 25, 1973

Inventor(s) Klaus Wagner, Ludwig Eue and Erich Klauke

Page 1

It is certified that error appears in the above-identified patent and that said Letters Patent are hereby corrected as shown below:

Column 3, line 72, after atoms delete  "cycloalkyl with 5 to 6 carbon atoms, aral-"

and insert therefor  --hydroxyalkyl with 1 to 4 carbon atoms,"

Column 4, line 54, delete misspelled word  "(Scenecio)"

and insert therefor  --(Senecio)--.

Column 4, line 54, delete misspelled word  "(Glossypium)"

and insert therefor  --(Gossypium)--.

Column 4, line 56, delete misspelled word  "monocotyledone"

and insert therefor  --monocotyledons--.

Column 4, line 57, after the word  "(Festuca"

insert therefor  --a closed parenthesis [)].

Column 5, line 40, delete misspelled word  "procides"

and insert therefor  --provides--.

UNITED STATES PATENT OFFICE
CERTIFICATE OF CORRECTION

Patent No. 3,781,323      Dated December 25, 1973

Inventor(s) Klaus Wagner, Ludwig Eue and Erich Klauke

It is certified that error appears in the above-identified patent and that said Letters Patent are hereby corrected as shown below:

Column 6, line 44, delete misspelled word "dificient"

and insert therefor --deficient--.

Signed and sealed this 3rd day of December 1974.

(SEAL)
Attest:

McCOY M. GIBSON JR.
Attesting Officer

C. MARSHALL DANN
Commissioner of Patents